United States Patent
Shivnath et al.

(10) Patent No.: US 7,499,834 B1
(45) Date of Patent: Mar. 3, 2009

(54) SYSTEM AND METHODS FOR REPORTING DEVICE ALLOCATION

(75) Inventors: Anuradha Shivnath, Southborough, MA (US); Paul J. Timmins, Natick, MA (US); Christopher A. Chaulk, Franklin, MA (US); Serge Marokhovsky, Upton, MA (US); Viren Pherwani, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 531 days.

(21) Appl. No.: 10/955,588

(22) Filed: Sep. 30, 2004

(51) Int. Cl.
*G06F 11/30* (2006.01)
*G06F 15/00* (2006.01)
*G21C 17/00* (2006.01)

(52) U.S. Cl. .............. 702/185; 702/155; 702/179; 711/100; 711/173; 711/205; 714/769; 709/220; 709/226

(58) Field of Classification Search ............... 702/155, 702/179, 185.1, 88; 711/100, 153, 154, 170, 711/173, 205; 710/74; 725/115; 714/769; 709/220, 223, 226, 208
See application file for complete search history.

(56) References Cited

U.S. PATENT DOCUMENTS

| 7,017,023 | B1 * | 3/2006 | Knight | 711/170 |
| 7,130,909 | B2 * | 10/2006 | Yamashita et al. | 709/226 |
| 7,133,907 | B2 * | 11/2006 | Carlson et al. | 709/220 |
| 7,143,260 | B2 * | 11/2006 | Dalal et al. | 711/170 |

OTHER PUBLICATIONS

Oguchi et al., 'Data Mining on PC Cluster Connected with Storage Area Network: Its Preliminary Experimental Results', 2001, IEEE Publication, pp. 2145-2149.*
Hulen et al., 'Storage Area Networks and the High Performance Storage Systems', 2001, LLNL Publication, pp. 225-240.*
Wilson, 'Managing a Fiber Channel Storage Area Network', Nov. 20, 1998, SNIA Publication, pp. 1-12.*
Wong, 'Storage Area Networks: A Blueprint for Early Deployment', Jan. 2001, pp. 1-27.*

* cited by examiner

*Primary Examiner*—Edward Raymond
*Assistant Examiner*—Elias Desta
(74) *Attorney, Agent, or Firm*—Chapin IP Law; Barry W. Chapin, Esq.

(57) ABSTRACT

A storage area network (SAN) management application generates device allocation reports displaying foundation variables, device specific parameters, and computed, derived fields for different types of storage arrays, without burdening the allocation report with extraneous parameters through the use of a layout indicative of the information included on the report, providing a streamlined and seamless allocation report. The SAN management application defines a layout indicative of the foundation variables, device attributes, and derived fields requested in an allocation report. The user selected layout indicates the requested allocation parameters for a report, indicative of the foundation variable, device attributes, and derived fields, and also indicates the device usage metrics for computing the derived fields from the foundation variables and device attributes. In this manner, a SAN operator requests an allocation report indicative of only the information sought, and need not correlate multiple reports or manually synthesize report output for determining derived fields.

22 Claims, 11 Drawing Sheets

Array Device Allocation - Accessible Used Devices
Jun 21, 2004 4:10 AM

| Array # | Array Type | Array Device Name | Array Device Type | Meta Device Capacity-Raw (GB) | Meta Device Capacity-Usable (GB) | Array Allocated? |
|---|---|---|---|---|---|---|
| 00018460C237 | Symmetrix | 009 | RDF1+Mir | 16.86 | 8.43 | Yes |
| 00018460C237 | Symmetrix | 00A | RDF1+Mir | 16.86 | 8.43 | Yes |
| 00018460C237 | Symmetrix | 00F | RDF1+Mir | 16.86 | 8.43 | Yes |
| 00018460C237 | Symmetrix | 010 | RDF1+Mir | 16.86 | 8.43 | Yes |
| 00018460C237 | Symmetrix | 019 | RDF1+Mir Meta Head | 33.72 | 16.86 | Yes |
| 00018460C237 | Symmetrix | 027 | 2-Way Mir Meta Head | 33.72 | 16.86 | Yes |
| 00018460C237 | Symmetrix | 02D | 2-Way Mir | 16.86 | 8.43 | Yes |
| 00018460C237 | Symmetrix | 096 | 2-Way BCV Mir | 16.86 | 8.43 | Yes |
| 00018460C237 | Symmetrix | 09E | 2-Way BCV Mir | 16.86 | 8.43 | Yes |
| 00018460C237 | Symmetrix | 09F | 2-Way Mir | 16.86 | 8.43 | Yes |
| 00018460C237 | Symmetrix | 0A1 | 2-Way Mir | 16.86 | 8.43 | Yes |
| 00018460C237 | Symmetrix | 0A2 | 2-Way BCV Mir | 16.86 | 8.43 | Yes |
| 00018460C237 | Symmetrix | 0A3 | 2-Way Mir | 16.86 | 8.43 | Yes |
| 00018460C316 | Symmetrix | 0A9 | 2-Way Mir | 4.25 | 2.13 | Yes |
| 00018460C316 | Symmetrix | 0AA | 2-Way Mir | 4.25 | 2.13 | Yes |
| 00018460C316 | Symmetrix | 0AB | 2-Way Mir | 4.25 | 2.13 | Yes |

Fig. 8

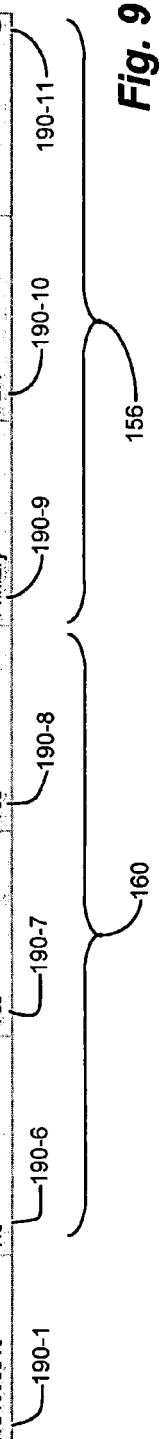

Fig. 9

| Array ▲ | LUN Masked? | Mapped? | Used By Volume Group? | Array Allocation Type | Emulation | # Ports |
|---|---|---|---|---|---|---|
| 000184600237 | Yes | Yes | Yes | Primary | FBA | 1 |
| 000184600237 | Yes | Yes | Yes | Primary | FBA | 1 |
| 000184600237 | Yes | Yes | Yes | Primary | FBA | 1 |
| 000184600237 | Yes | Yes | Yes | Primary | FBA | 1 |
| 000184600237 | Yes | Yes | Yes | Primary | FBA | 1 |
| 000184600237 | Yes | Yes | Yes | Primary | FBA | 1 |
| 000184600237 | Yes | Yes | Yes | Primary | FBA | 1 |
| 000184600237 | Yes | Yes | Yes | Local Replica | FBA | 1 |
| 000184600237 | Yes | Yes | Yes | Local Replica | FBA | 1 |
| 000184600237 | Yes | Yes | Yes | Primary | FBA | 1 |
| 000184600237 | Yes | Yes | Yes | Local Replica | FBA | 1 |
| 000184600237 | Yes | Yes | Yes | Primary | FBA | 1 |
| 000184600316 | No | Yes | Yes | Primary | FBA | 2 |
| 000184600316 | No | Yes | Yes | Primary | FBA | 2 |

| Array Device Allocation - Host Accessible | | | | Jun 21, 2004 4:10 AM | |
|---|---|---|---|---|---|
| Array | Host/HBA | Host Accessible? | Host Allocated? | Host Accessible Description | Host Allocated Description |
| 00-01o1-010 (SMI-S) | GIGW2K06 (SMI-S) | Yes | | Inconsistent data, non Access Logix CLARiiON with LUN masked devices | Inconsistent data, non Access Logix CLARiiON with LUN masked devices |
| 00-01o1-010 (SMI-S) | GIGW2K06 (SMI-S) | Yes | | Inconsistent data, non Access Logix CLARiiON with LUN masked devices | Inconsistent data, non Access Logix CLARiiON with LUN masked devices |
| 00-01o1-010 (SMI-S) | GIGW2K06 (SMI-S) | Yes | | Inconsistent data, non Access Logix CLARiiON with LUN masked devices | Inconsistent data, non Access Logix CLARiiON with LUN masked devices |
| 00-01o1-010 (SMI-S) | GIGW2K06 (SMI-S) | Yes | | Inconsistent data, non Access Logix CLARiiON with LUN masked devices | Inconsistent data, non Access Logix CLARiiON with LUN masked devices |
| 00-01o1-010 (SMI-S) | GIGW2K06 (SMI-S) | Yes | | Inconsistent data, non Access Logix CLARiiON with LUN masked devices | Inconsistent data, non Access Logix CLARiiON with LUN masked devices |
| 00-01o1-010 (SMI-S) | GIGW2K06 (SMI-S) | Yes | | Inconsistent data, non Access Logix CLARiiON with LUN masked devices | Inconsistent data, non Access Logix CLARiiON with LUN masked devices |
| 000000006210 | LOSBE103 | Yes | Yes | LUN Masked, Zoned and Connected to Host | Accessible Primary Device |
| 000000006210 | LOSBE103 | Yes | Yes | LUN Masked, Zoned and Connected to Host | Accessible Primary Device |
| 000000006210 | LOSBE103 | Yes | Yes | LUN Masked, Zoned and Connected to Host | Accessible replica with unaccessed source device |
| 000000006210 | LOSBE103 | Yes | Yes | LUN Masked, Zoned and Connected to Host | Accessible replica with unaccessed source device |
| 000000006210 | LOSBE103 | Yes | Yes | LUN Masked, Zoned and Connected to Host | Accessible replica with no Source device |

Fig. 10

SYSTEM AND METHODS FOR REPORTING DEVICE ALLOCATION

BACKGROUND OF THE INVENTION

Conventional managed information environments, such as a Storage Area Network (SAN), typically employ an interconnection of storage arrays operable for storing large quantities of data, in which the storage arrays are responsive to a management application such as an SNMP (Simple Network Management Protocol) based application. The SAN includes a plurality of host computers coupled to users for storage and retrieval of the data in the storage array devices. The SAN, therefore, supports an enterprise such as a corporation or business entity with conventional information storage and retrieval services via the SAN. The SAN management application allows administration activities, such as monitoring and maintenance of the storage arrays, for ensuring maximum throughput and efficiency of the data to and from users via the SAN.

A conventional SAN, therefore, employs a plurality of hosts, each connected to one or more storage arrays. The storage arrays each include a plurality of individual storage units, also known as disk drives or spindles, operating as an integrated storage medium. In a configured SAN, each of the storage arrays may have different numbers, types, and arrangements of the storage units, and are often from multiple vendors. Further, the storage within a storage array may be partitioned or designated according to data redundancy or protection schemes, such as shadowing, journaling, and RAID arrangements, and may also be partitioned for usage by certain subsets of users. Accordingly, tracking consumption of available storage and identifying areas of excessive or sparse consumption becomes a formidable task.

SUMMARY

In a storage area network, multiple storage arrays having varying amounts of storage and often from different vendors provide a large aggregate body of storage capacity to support a user community. In such a storage array network, a system manager or operator is often charged with the responsibility for maintaining the storage arrays in an efficient manner, i.e. ensuring adequate storage to users or user groups and avoiding excessive or disproportionate consumption of storage by hosts using the storage, the maintenance of which is also known as so-called "SAN hygiene." It would therefore be beneficial to provide allocation reports as an indication of storage consumption in a manageable and readable form which indicates sparse or excessive consumption of storage in a pinpointed manner and which avoids extraneous or excessive information which can tend to cloud or dilute salient data.

Configurations of the invention are based, in part, on the observation that it is difficult for a SAN manager to identify all related and derived fields pertaining to storage allocation among multiple heterogeneous storage arrays. Conventional reports tend to focus on only a particular type or vendor of storage array, requiring interpretation and synthesis of multiple report formats. Other conventional reports may not include related or derived fields in a single report, requiring offline computations and/or analysis to arrive at the desired allocation report results. Therefore, configurations of the invention discussed below substantially overcome many of the drawbacks with conventional storage allocation reports by presenting foundation variables, device specific parameters and computed, derived fields for different types of storage arrays, without burdening the allocation report with extraneous parameters, through the use of a layout indicative of the information included on the report.

Accordingly, configurations of the invention define a layout indicative of foundation variables, device attributes and derived fields requested in such a storage allocation report. The layout may be predetermined from a menu pulldown, or may be customized from among available allocation parameters and report formats. Foundation variables are generally hardcoded items such as the vendor, type, and name of a particular device (storage array). Device attributes are items specific to a device which may be modified by reconfiguring, such as redundancy partitioning and emulation. Derived parameters are items deterministic from other items, which are computed according to a particular device usage metric, or allocation metric. The layout therefore indicates the requested allocation parameters for a report, indicative of the foundation variable, device attributes, and derived fields, and also indicates the device usage metrics for computing the derived fields from the foundation variables and device attributes. In this manner, a SAN operator may request an allocation report indicative of only the information sought, and need not correlate multiple reports or manually synthesize report output for determining derived fields.

In further detail, the method of reporting device allocation in the storage area network includes generating and storing allocation data indicative of allocation parameters of manageable entities in the storage area network, and receiving a layout indicative of a user specified subset of the allocation parameters for display in an output report, in which each of the parameters in the subset corresponds to output fields operable for display. A management application identifies, from the output fields, derived fields specified in the layout, in which the derived fields are determinable from other allocation parameters, and determines usage metrics operable to compute the derived fields from the allocation parameters. The management application then computes the identified derived fields from the determined usage metrics using the allocation parameters for display to a user as an allocation report on a display console.

In the exemplary configuration discussed further below, the allocation parameters are values concerning storage arrays in the SAN and include foundation variables, device attributes, and derived fields, in which the foundation variables are predetermined, the device attributes correspond to a configuration of a particular storage array device, and the derived fields are operable for computation from other allocation parameters. As indicated above, each of the storage arrays includes a plurality of storage array devices, or disk drives. The management application is operable to compute the derived fields from predetermined usage metrics, in which the usage metrics are indicative of allocation parameters and operations for computing the derived fields. The usage metrics are further operable to indicate predetermined allocation parameters, such that the management application may retrieve device attributes from at least one storage array device, and compute the derived fields from operations specified by the usage metrics. Further, the allocation parameters presented as the output fields are indicative of a progression of consumed storage, including available storage, reserved storage, configured storage, allocated storage, and used storage.

In the exemplary configuration, computing the derived fields for the allocation report includes identifying corresponding allocation parameters from storage arrays of each of a plurality of vendors, and coalescing the corresponding parameters for generating the output fields. As a typical SAN includes storage arrays from multiple vendors, coalescing typically involves identifying different vendor specific allocation parameters employed for computing a derived field.

Further, the layout may be indicative of a filter selection, in which the filter selection specifies allocation parameters for inclusion as output fields. Such a filter selection may incorporate a filtering criteria including at least one of LUN masking, HBA ports, masking and vendors.

The invention as disclosed above is described as implemented on a computer having a processor, memory, and interface operable for performing the steps and methods as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that, when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIGS. 8-10 are exemplary screen displays of device allocation reports illustrating foundation variables, device attributes, and derived fields.

DETAILED DESCRIPTION

Storage area networks employ allocation reports to identify configurations of storage among the storage arrays in the network. In a large storage area network (SAN), it may be difficult for a SAN manager to identify all related and derived fields pertaining to storage allocation among multiple heterogeneous storage arrays. Conventional reports tend to focus on only a particular type or vendor of storage array, requiring interpretation and synthesis of multiple report formats. Other conventional reports may not include related or derived fields in a single report, requiring offline computations and/or analysis in order to arrive at the desired allocation report results. Device allocation reports generated by a SAN management application substantially overcome these shortcomings by presenting foundation variables, device specific parameters, and computed, derived fields for different types of storage arrays, without burdening the allocation report with extraneous parameters through the use of a user selectable layout indicative of the information included on the report.

The SAN management application discussed further below defines a layout indicative of foundation variables, device attributes, and derived fields, requested in an allocation report. Foundation variables are generally hardcoded items such as the vendor, type, and name of a particular storage array. Device attributes are items specific to a device which may be modified by reconfiguring, such as redundancy partitioning and emulation (shadowing, RAID, etc.). Derived parameters are items deterministic from other allocation parameters (i.e. foundation variables and device attributes), which are computed according to a particular device usage, or allocation, metric. The layout therefore indicates the requested allocation parameters for a report, indicative of the foundation variable, device attributes, and derived fields, and also indicates the device usage metrics for computing the derived fields from the foundation variables and device attributes. In this manner, a SAN operator may request an allocation report indicative of only the information sought, and need not correlate multiple reports or manually synthesize report output for determining derived fields. Further, the allocation report may be employed to complement or verify data in other reports, as many reports may be derived from the allocation data gathered and stored by the mechanism discussed herein.

Figure 1:
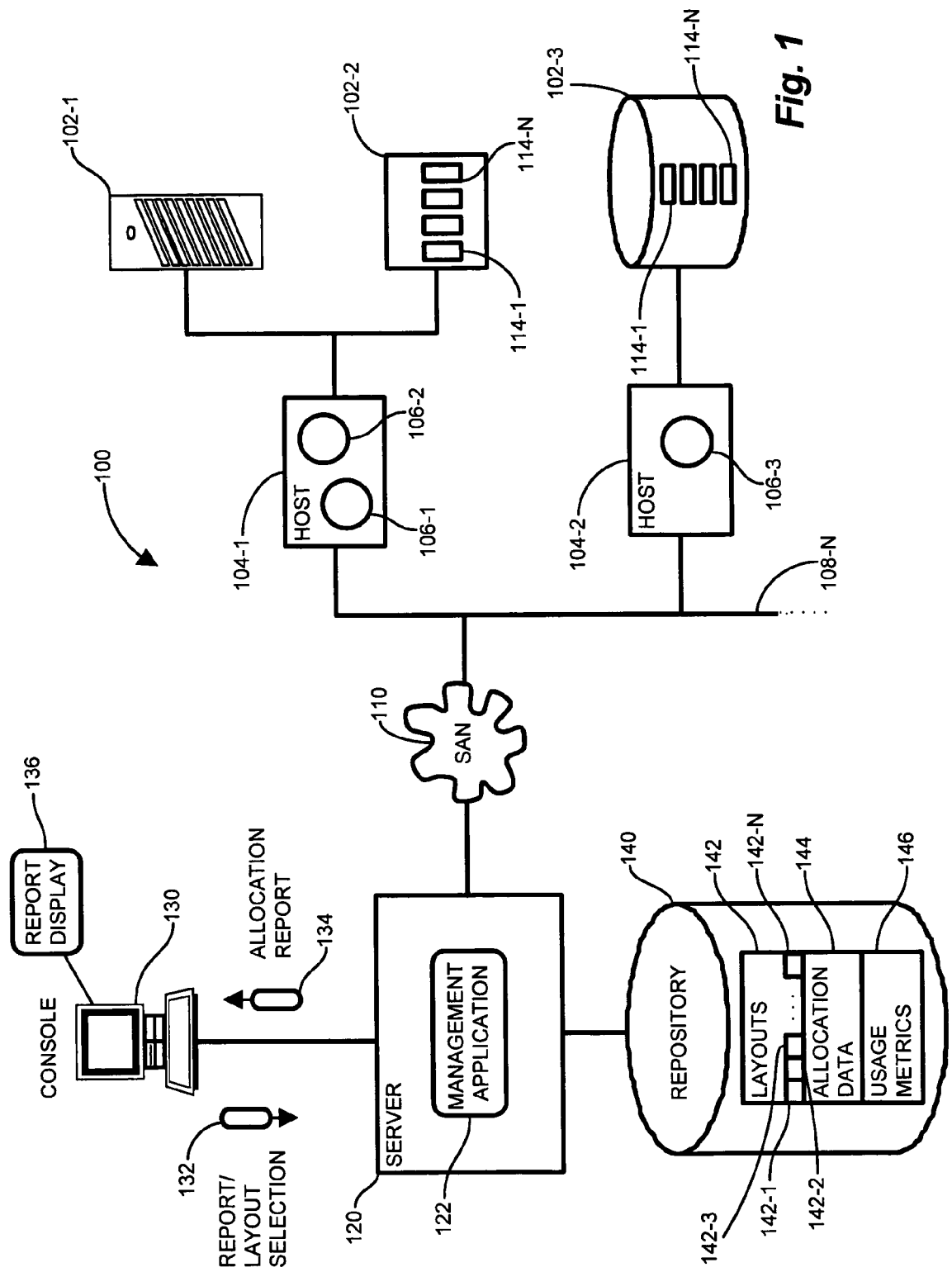
FIG. 1 is a context diagram of an exemplary managed information environment including a storage area network and suitable for use with configurations of the invention.

FIG. 1 is a context diagram of an exemplary managed information environment 100 including a storage area network 110 and suitable for use with configurations of the invention. Referring to FIG. 1, the storage area network (SAN) 110 is an interconnection of storage arrays 102-1 ... 102-3 (102 generally), hosts 104-1 ... 104-2 (104 generally), agents 106-1 ... 106-3 (106 generally), and other manageable entities, collectively 108-N (108 generally), including connectivity devices, databases, and other nodes (not specifically shown). Each of the storage arrays 102 includes one or more storage array devices 114-N (e.g. disk drives). The SAN 110 connects to a server 120 executing a management application 122 operable to monitor and manipulate the manageable entities 108-N in the SAN. The management application 122 is responsive to a console 130 for receiving report and layout selections 132 via user requests and for generating allocation reports 134 for presentation to a user or operator on the report display 136. A repository 140, such as a managed object database, connects to the server 120 and stores layouts 142, allocation data 144, and usage metrics 146. The individual layouts 142-1 ... 142-N are user selectable reporting formats indicative of allocation parameters and other report content of the allocation reports 134. The allocation data 144, as indicated above, includes raw data gathered from the storage arrays 102 by the agents 106 on a periodic bases for SAN management support. The usage metrics 146 define interrelations between the various allocation parameters and identify deterministic relations between various allocation parameters, such as allocation parameters computable from other allocation parameters for presentation in the allocation report 134.

Figure 2:
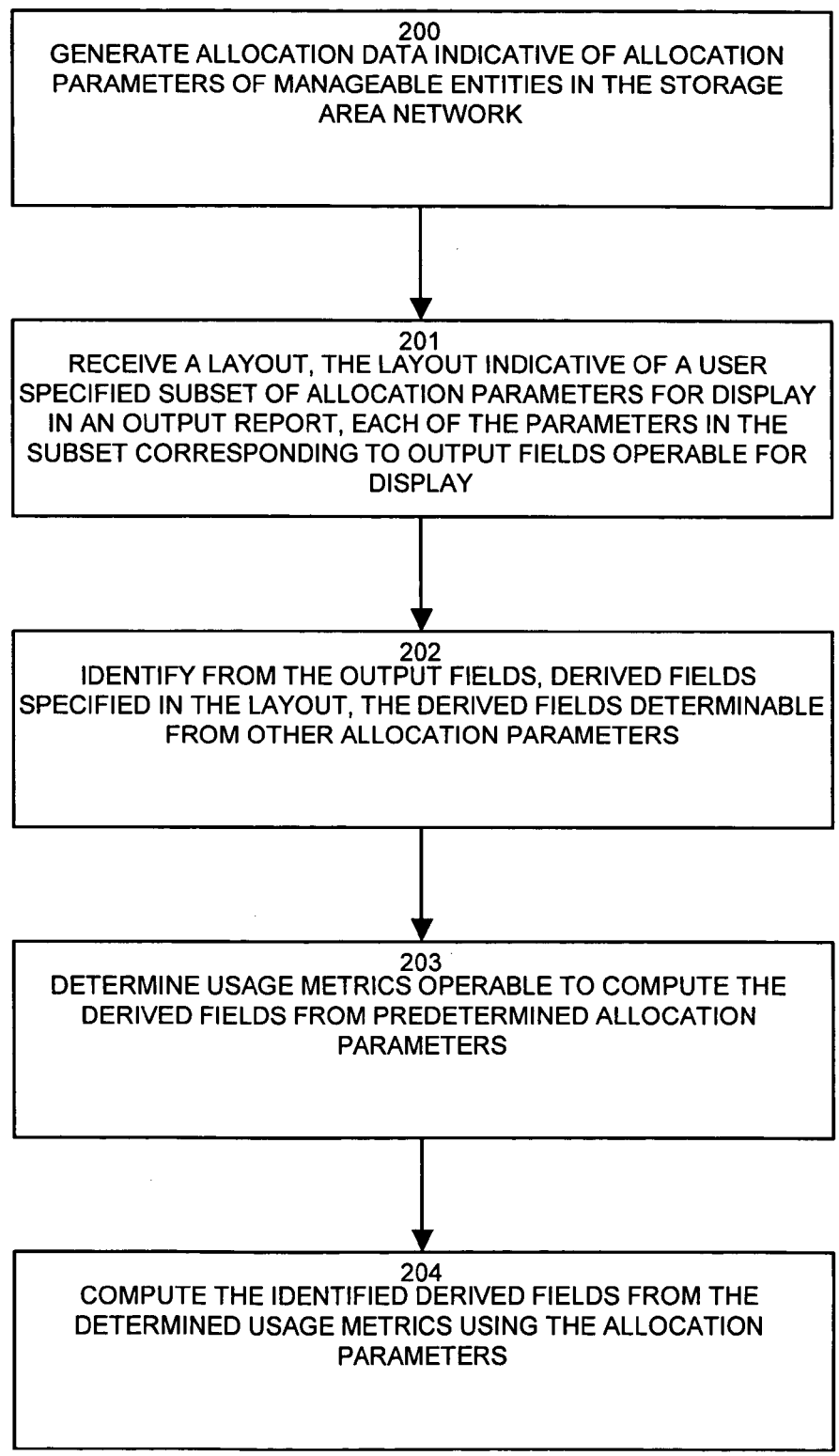
FIG. 2 is a flowchart of generation of a device allocation report concerning the environment in FIG. 1.

FIG. 2 is a flowchart of generation of a device allocation report 134 concerning the environment in FIG. 1. Referring to FIGS. 1 and 2, the method of reporting device allocation in the storage area network 110 as disclosed herein includes generating allocation data 144 indicative of allocation parameters of manageable entities 108, such as storage arrays 102, in the storage area network, as shown at step 200. The agents 106, in communication with the storage arrays 102, gather the allocation data 144, typically as part of routine SAN 110 maintenance. In the exemplary arrangement, the allocation data 144 may be an aggregated file of markup data operable for further processing by a variety of processes in the management application 122. For example, the allocation data 144 may be a file in a markup language, such as an XML file, which is further parseable according to XML syntax such as via a SAX parser, as is known to those of skill in the art.

The management application 122 receives a layout 142-N indication from the console 130 GUI, in which the layout 142 is indicative of a user or operator specified subset of allocation parameters for display in the output allocation report 134, as depicted at step 201. In such a layout, each of the allocation parameters in the subset corresponds to output fields operable for display, and are therefore indicative of the content of the allocation report 134 for the report display 136. As indicated above, the layout may be predetermined from a typical windows menu pulldown, or may be customized from among available allocation parameters and report formats, or other suitable GUI mechanism, such as radio buttons, file selection, or free-form text entry.

The management application 122 identifies, from the output fields indicated in the selected layout 142-N, derived fields specified in the layout 142-N, in which the derived fields are those which are determinable from other allocation parameters, as depicted at step 202. The management application 122 then determines the applicable usage metrics 146, discussed further below, operable to compute the indicated derived fields from the predetermined allocation parameters from the allocation data 144, as shown at step 203. The derived fields are indicative of storage quantums and/or totals which are deterministic from other allocation parameters, either the foundation variables or the device attributes, which generally are obtainable from the gathered allocation data 144. The usage metrics 146 define the operations for computing the derived fields from the underlying foundation variables and device attributes. The management application 122 then employs the usage metrics 146 to compute the identified derived fields from the determined usage metrics using the allocation parameters (e.g. foundation variables and device attributes), as depicted at step 204.

Figure 3:
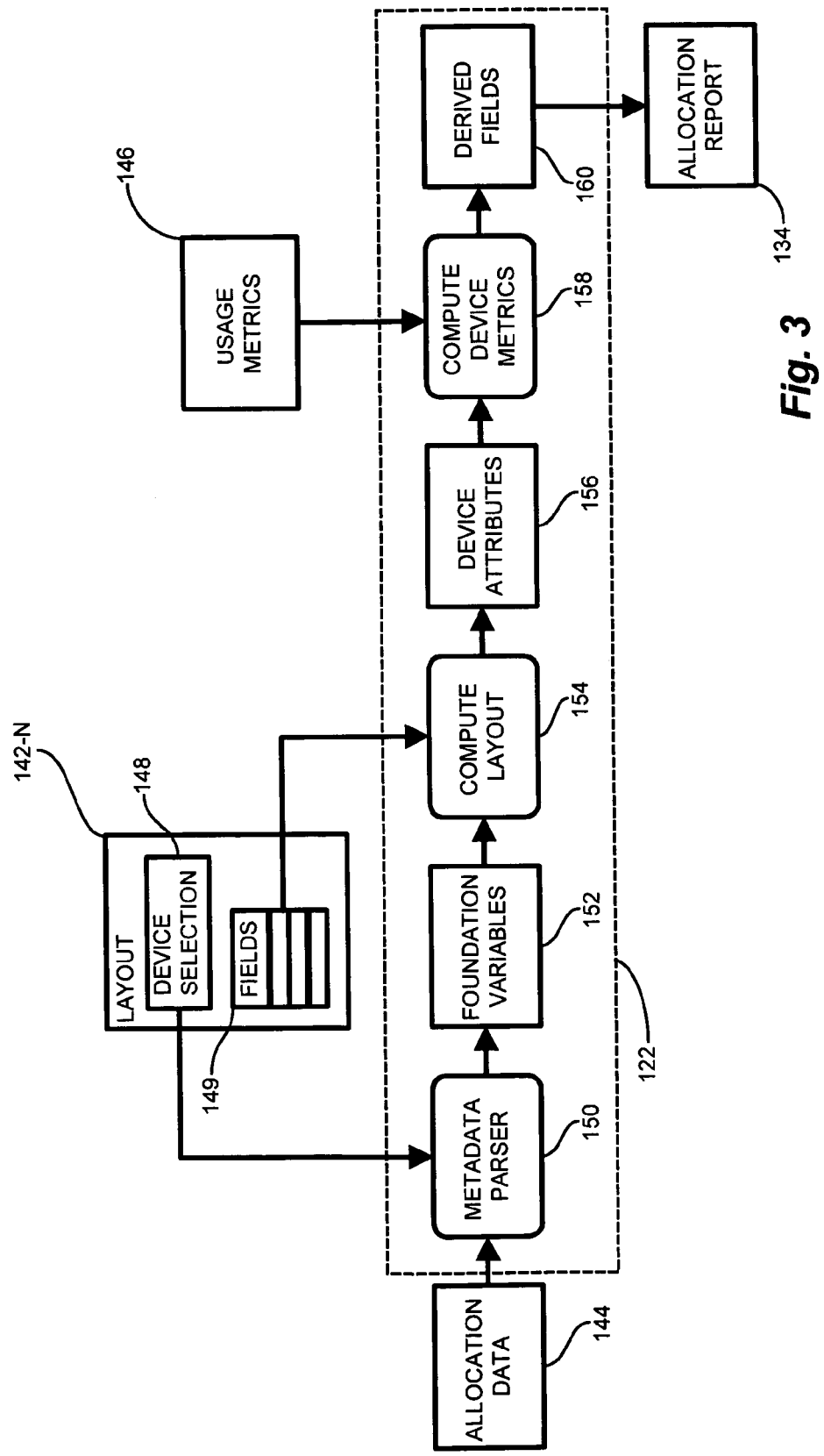
FIG. 3 is a data flow diagram of the device allocation report generation using the flowchart of FIG. 2.

FIG. 3 is a data flow diagram of the device allocation report generation using the flowchart of FIG. 2. Referring to FIGS. 1 and 3, the agents 106 periodically gather the allocation data 144 as part of ongoing SAN maintenance and hygiene activity. A metadata parser 150 in the management application 122 receives a device selection 148 via the user requested layout 142-N. The metadata parser 150 parses the allocation data 144 and retrieves a set of foundation variables 152 for each of the selected devices 148. The layout 142 is further indicative of fields 149, corresponding to allocation parameters selected for r output on the resulting allocation report 134. As indicated above, the allocation parameters displayed on the allocation report 134 include foundation variables 152, device attributes 156 and derived fields 160, discussed further below. A compute layout process 154 identifies the device attributes 156 corresponding to the selected allocation parameters for the selected storage array devices 114. The compute layout process 154 may retrieve the device attributes from the foundation variables 152 or from the allocation data 144. The device attributes 156 and foundation variables 152 are then employed by the usage metrics 146 corresponding to the requested layout 142. A compute device metrics 158 process is responsive to the usage metrics 146 and computes derived fields 160 from the device attributes 156 and the foundation variables 152. The foundation variables 152, device attributes 156, and derived fields 160 indicated by the requested layout 142 are then employed as allocation parameters for the allocation report 134.

Figure 4:
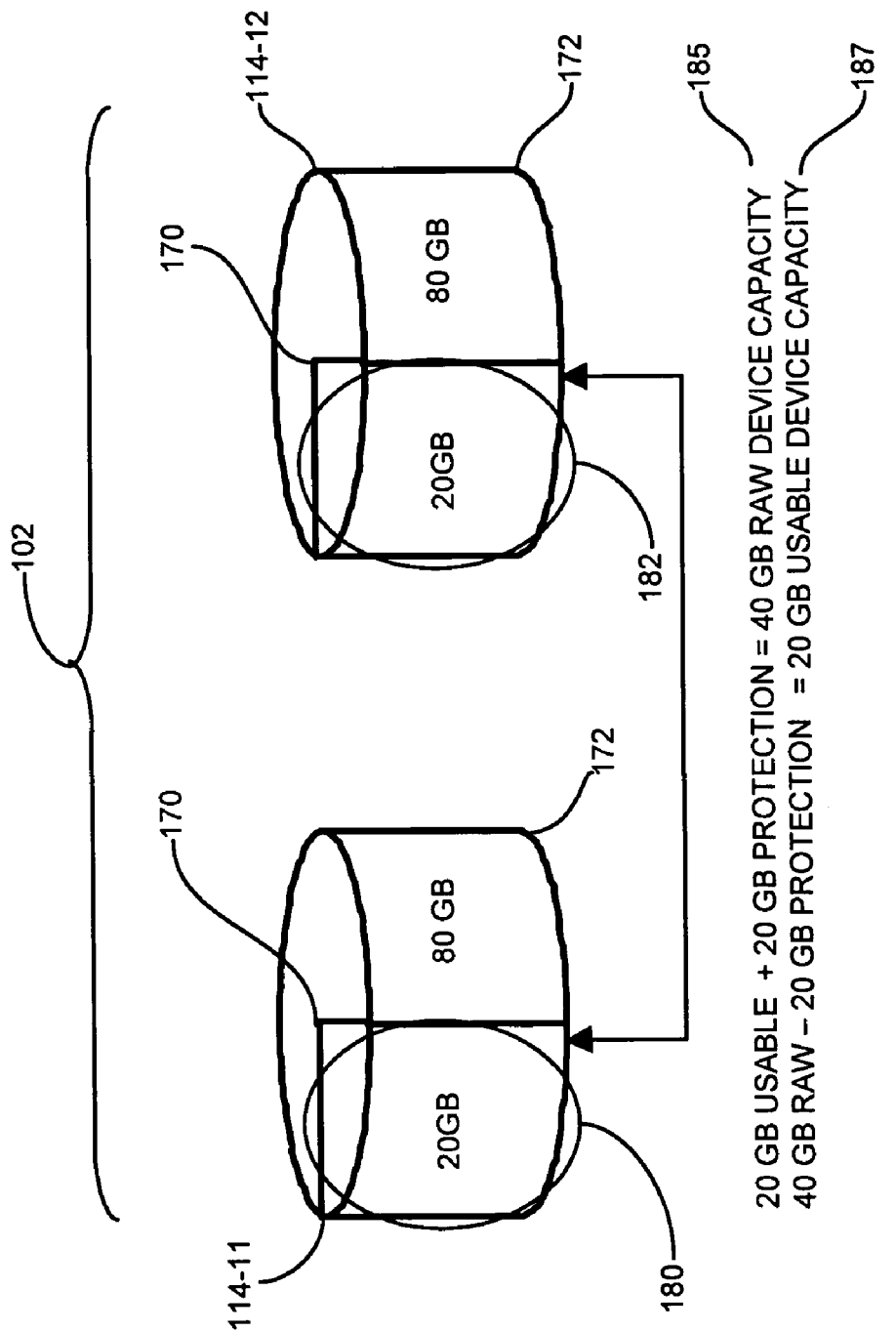
FIG. 4 is an exemplary disk array employed for computing derived fields for the device allocation report in FIG. 3.

FIG. 4 is an exemplary disk array employed for computing derived fields for the device allocation report 134 in FIG. 3. Referring to FIGS. 3 and 4, the exemplary disk array 102 has a plurality of storage array devices including devices 114-11 and 114-12. Each storage array device 114-11 and 114-12 represents a physical disk drive, or spindle, in a storage array 102. Raw disk capacity refers to the size of the unformatted physical disk, or 100 Gb for each of array devices 114-11 and 114-12 in the example shown. Accordingly, the two array devices (disks) 114-11 and 114-12 are actually two physical array disks configured as array device 102, having a raw device capacity of 100 Gb. Raw device capacity refers to the capacity of a device plus the capacity required for protection capacity, i.e. mirroring, shadowing and/or parity RAID, defined for the device. Usable capacity is that portion of raw device capacity that is reserved for host use and for internal array operations. Accordingly, usable capacity is the raw device capacity minus the capacity required for the protection level capacity defined for the device. In the example shown, each of the array devices has a raw disk capacity of 100 GB, of which 20 Gb is allocated 170 and 80 Gb remains available 172. Array device 114-11 therefore has 20 Gb usable capacity, shown by oval 180, and employs 20 Gb of protection capacity, shown by oval 182. The raw device capacity is therefore 20 Gb usable capacity on device 114-11+20 Gb protection capacity on device 114-12. Accordingly, it follows that usable capacity is raw capacity minus the protection capacity, or 40 Gb raw −20 Gb protection capacity=20 Gb usable device capacity. Accordingly, the derived parameters raw device capacity 185 and usable device capacity 187 are given by the following usage metrics:

| 20 Gb usable + 20 Gb protection = | 40 Gb raw device capacity | 185 |
|---|---|---|
| 40 Gb raw − 20 Gb protection = | 20 Gb usable device capacity | 187 |

Alternate arrangements employ other usage metrics for aggregating and distinguishing the various subdivisions and partitions of storage apportioned among the disk drives 114-N in the storage arrays 105.

Figure 5:
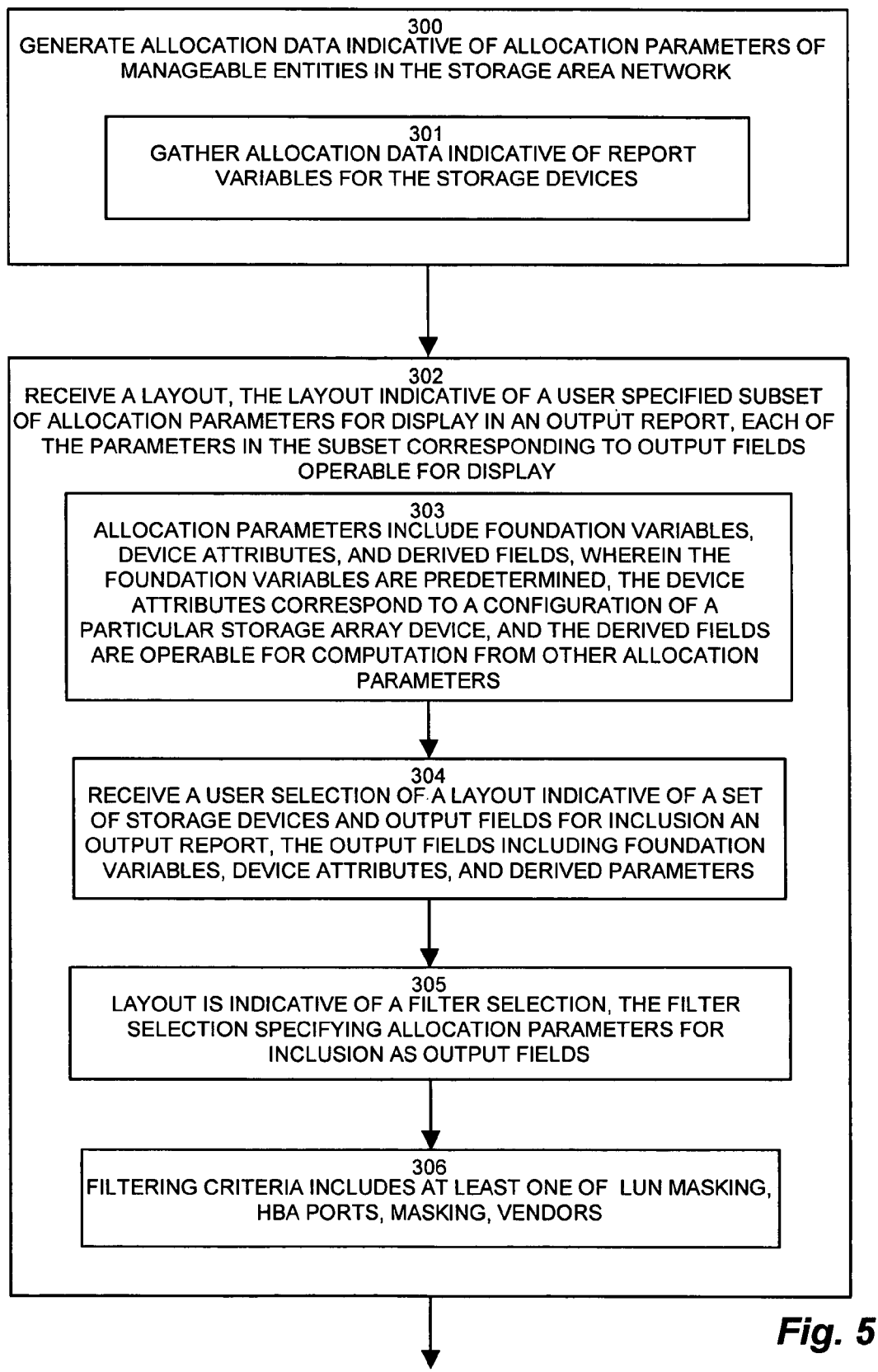
FIGS. 5-7 are a flowchart of device allocation reporting according to FIG. 3 in greater detail.
Figure 6:
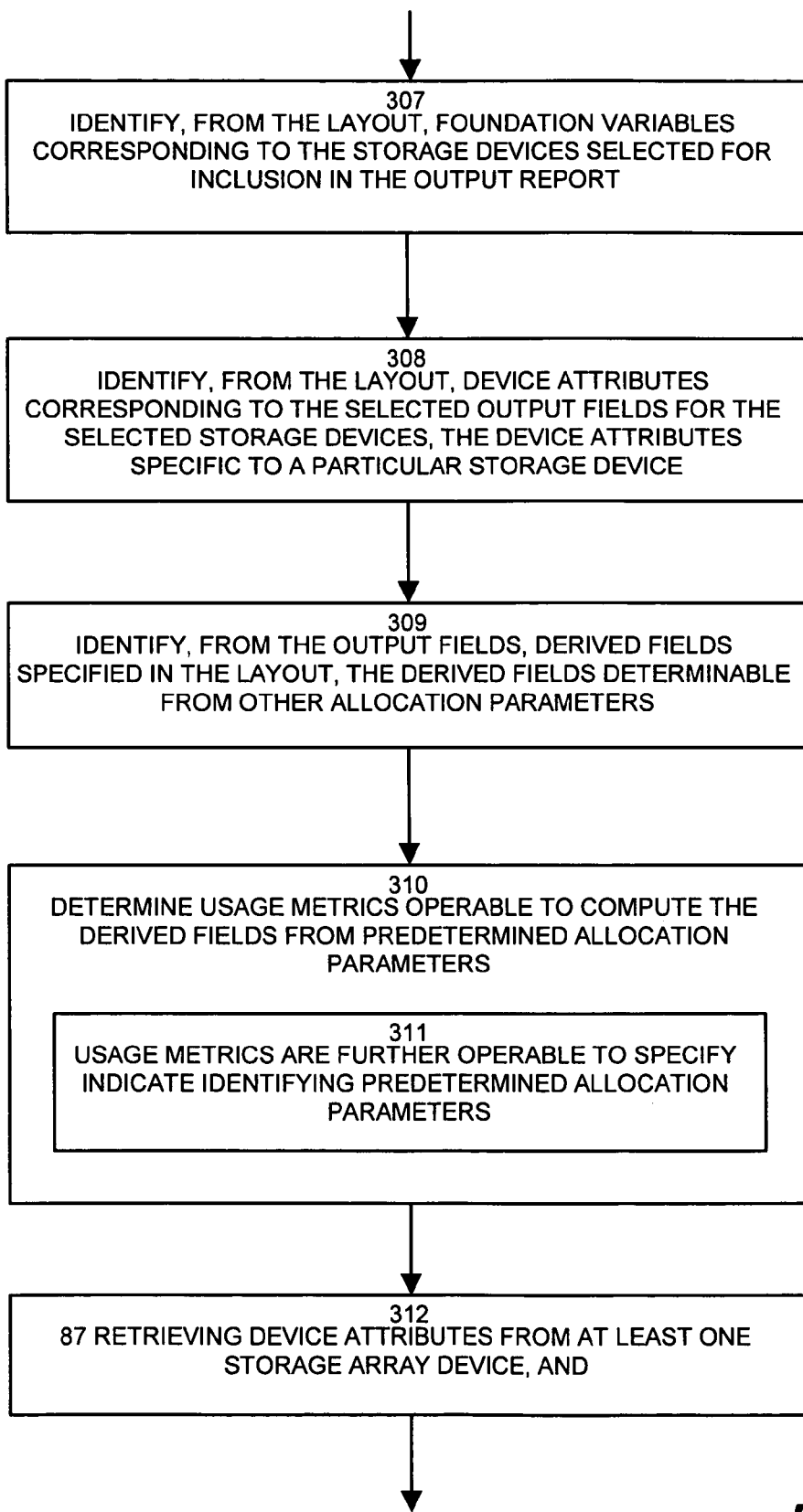
Figure 7:
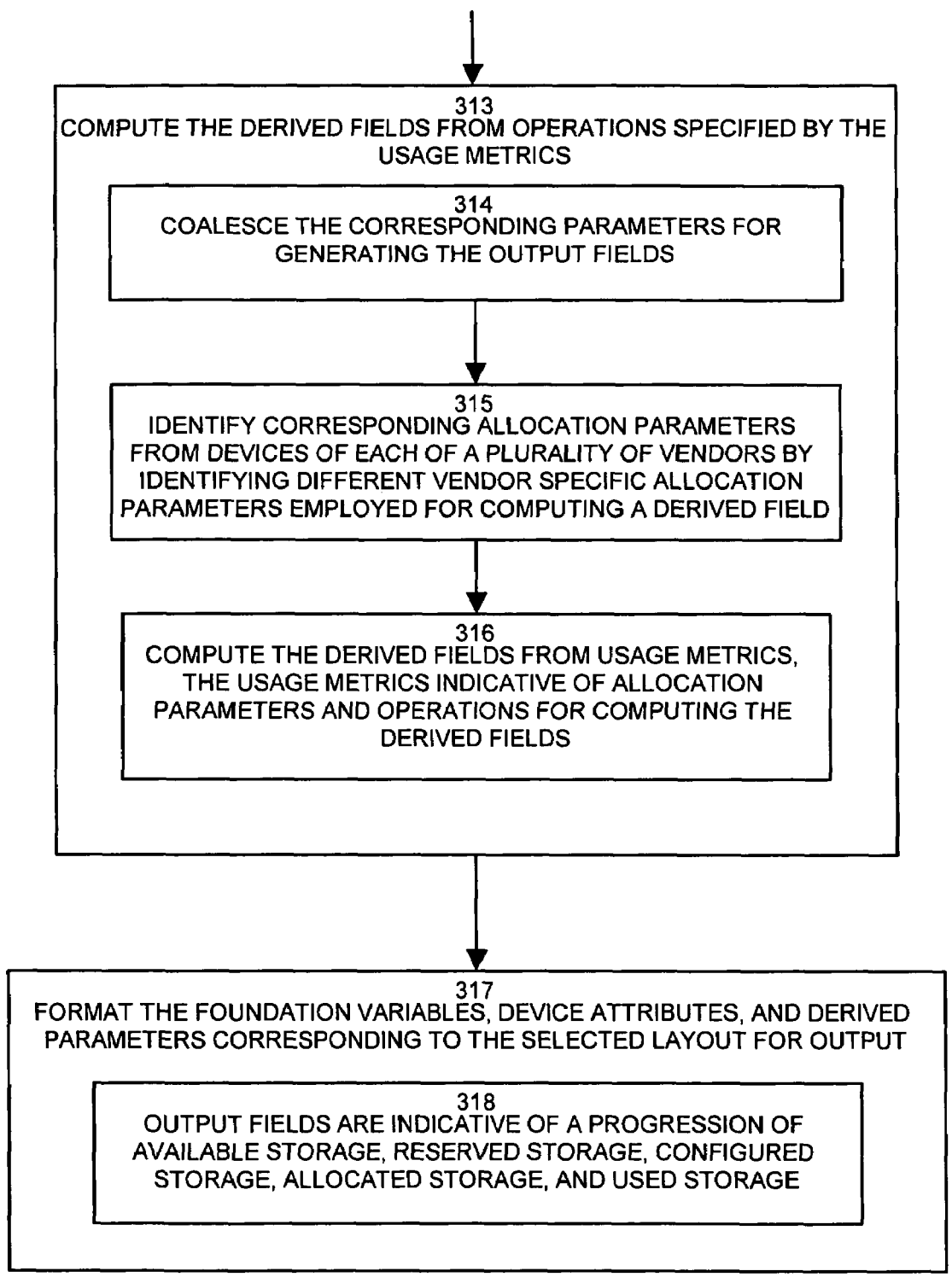

FIGS. 5-7 are a flowchart of device allocation reporting according to FIG. 3 in greater detail. Referring to FIGS. 1, 3 and 5-7, the management application 122 begins reporting device allocation in the storage area network 110 by generating allocation data indicative of allocation parameters of manageable entities in the storage area network, as depicted at step 300. The agents 106-N, responsive to periodic polling and/or event driven maintenance activity, gather allocation data 144 indicative of report variables for the storage array devices 114, as shown at step 301, for storage in the repository 140. The console 130 presents a GUI or other display to a user for presenting a selection of available layouts 142, or report formats. The GUI presents the selection via a pulldown menu or other console 130 selection, and the management application 122 receives the selected layout 142, as shown at step 302, in which the layout 142 is indicative of a user specified subset of allocation parameters for display in the output allocation report 134, as depicted at step 302. Through the indicated layout 142, the user selects a particular allocation report 134 including particular allocation parameters. Each of the allocation parameters in the subset, therefore, corresponds to output fields operable for display in the allocation report 134.

The different selectable layout 142-1.142-N allow specification of various allocation parameters. In the exemplary configuration, the allocation parameters include foundation variables 152, device attributes 156, and derived fields 160, in which the foundation variables 152 are predetermined, the device attributes 156 correspond to a configuration of a particular storage array device, and the derived fields 160 are operable for computation from other allocation parameters, as disclosed at step 303.

In further detail, the management application 122 receives a user selection 132 of one of the available layouts 142-N indicative of a set of storage array devices 114 and output fields for inclusion the output report 134, in which the output fields include one or more of the foundation variables 152, device attributes 156, and derived fields 160, as depicted at step 304. Further, in particular configurations, the layout 142 is indicative of a filter selection operable to specify allocation parameters for inclusion as output fields, as shown at step 305. The filter selection may include particular target values or ranges of values, for example. In the exemplary SAN environment 100, the filtering criteria may includes parameters such as LUN masking, HBA ports, masking, and vendors. Criteria such as LUN masking are operable to logically group storage arrays, as is known in the art.

The layout selection 142 specified by the user, therefore, indicates the desired allocation report 134, and specifies the format and fields therein. Further, configurations allow the user to select from predefined layouts 142, or to define custom layouts. The layout 142 is also indicative of the derived fields 160 for the report. Accordingly, the management application 122 identifies, from the layout, foundation variables 152 corresponding to the storage array devices 114 selected for inclusion in the output report, as shown at step 307. The foundation variables 152, generally, are static labels or specifications associated with a storage array, such as the physical number of disk drives and total capacity.

The management application 122 further identifies, from the layout 142, device attributes corresponding to the selected output fields for the selected storage array devices 114, in which the device attributes are specific to a particular storage device, as shown at step 308. The device attributes 156, therefore, are generally configurable fields which are specific to the storage array device 114, but which are modifiable through configuration management, such as partitioning for protection and redundancy.

The management application 122 identifies, from the desired output fields, derived fields 160 specified in the layout 142, in which the derived fields 160 are determinable from other allocation parameters, i.e. from the foundation variables 152, device attributes 156, and also from other derived fields 160, as shown at step 309. The derived fields 160, therefore, are computable from other allocation parameters, such as by summation of storage discussed above with respect to FIG. 4. Accordingly, the management application 122 determines the applicable usage metrics 146 operable to compute the derived fields 160 from the predetermined allocation parameters, as shown at step 310. The usage metrics 146 are stored in the repository 140 as procedures, and are further operable to indicate predetermined allocation parameters and mathematical computations and operations for computing the derived parameters, as depicted at step 311.

Having identified the usage metrics 146, the management application 122 retrieves the device attributes from the storage array 102 and/or storage array devices 114 implicated by the applicable usage metrics 146, as shown at step 312. The management application then computes the derived fields 160 from operations specified by the usage metrics 146, as shown at step 313. Computing further includes coalescing the allocation parameters by identifying different vendor specific allocation parameters employed for computing a particular derived field 160, as depicted at step 314. In the SAN 110, storage arrays 102 of multiple different vendors may be present. Accordingly, computing the derived fields 160 includes identifying corresponding allocation parameters from devices of each of a plurality of vendors, as shown at step 315, and coalescing the identified corresponding parameters for generating the output fields. Therefore, the usage metrics 146 coalesce the allocation parameters by identifying the vendor specific parameters contributing to or included in the computation of the derived parameters 160. The usage metrics 146 are indicative of vendor and/or device specific allocation parameters and operations for computing the derived fields, as shown at step 316. Typically, each storage array 102 has an application programming interface (API) specific to that vendor or device. The management application 122 includes or inherits the API to communicate with the storage array 102. Accordingly, the management application 122 identifies the corresponding parameters in the API of each vendor, and employs the corresponding parameters in computing the derived fields 160 to compute the derived parameter correctly despite dissimilar APIs and labels of API obtained fields.

The management application 122 formats the foundation variables 152, device attributes 156, and derived fields 160 corresponding to the selected layout 142 for output, as depicted at step 317. The reported output fields reflecting the allocation parameters, therefore, are indicative of a progression of available storage, reserved storage, configured storage, allocated storage, and used storage, depending on the usage metric employed and the derived parameters sought, based on the layout 142, as disclosed at step 318.

FIGS. 8-10 are exemplary screen displays of device allocation reports 134 illustrating the foundation variables 152, device attributes 156, and derived fields 160. Referring to FIGS. 4, and 8-10, an allocation report 134 representing the layout 142 for accessible used devices 154-1 is shown. In the exemplary report, the foundation variables include the array 190-1, array type 190-2, array device name 190-3 and host/HBA 190-12. The device attributes include the array device type 190-4, the array allocation type 190-9, the emulation 190-10 and Number of ports 190-11. The derived fields include, as indicated above, the raw device capacity 185 and usable device capacity 187, and also allocation 190-5, LUN masking 190-6, mapping 190-7, volume group use 190-8, host accessible 190-13, host allocated 190-14, host accessible description 190-15 and host allocated description 190-16.

Figure 11:
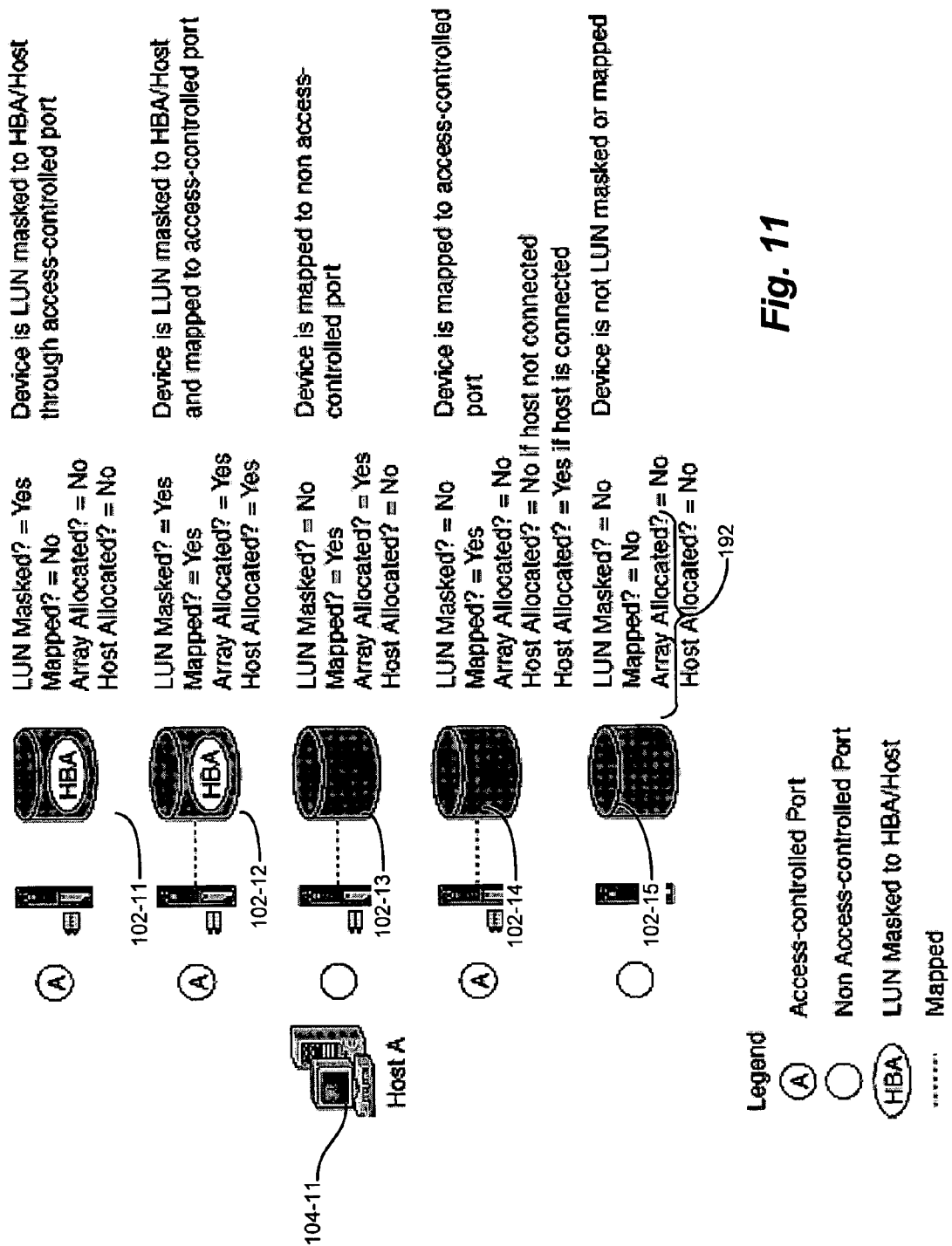
FIG. 11 shows allocation logic to compute derived fields.

The derived fields 160 concerning allocation and accessibility are computable according to predetermined metrics, or rules. FIG. 11 illustrates allocation rules 192 based on particular device attributes 156. Referring to FIG. 12, the host 104-11 connects to storage arrays 102-11 . . . 102-15, each illustration a particular set of conditions defining the allocation rules 192 and associated derived fields 160. Alternate configurations may employ alternative allocation rules for defining consumed storage, such as a set of rules depicted form a flowchart or state specification defining related fields.

In further detail, in the exemplary configuration encompassing a storage area network, the following allocation parameters may be specified using the available layouts (note that various vendor specific names may be trademarks of their respective companies). Further, the derived fields Host Accessible Description and Host Allocated Description further include criteria for identifying these fields from the underlying device attributes.

The device allocation report, in the exemplar configuration discussed herein, lists all array devices and provides details about each device including the capacity of the device (raw and usable), whether the device is allocated, and whether it is accessible to hosts.

With respect to raw and usable capacity, the term raw is used in the both in the context of physical disk capacity and device capacity. Raw disk capacity refers to the size of the unformatted physical disk. For example, Raw—Total (GB) is the sum of the capacities of the unformatted physical disks in the array. Raw device capacity refers to the capacity of the device plus the capacity required for the protection level (mirrors or parity RAID) defined for the device. In general, usable capacity is that portion of raw device capacity that is reserved for host use and for internal array operations. Usable capacity is raw device capacity minus the capacity required for the protection level (mirrors or parity RAID) defined for the device.

Descriptions of the allocation parameters included in the reports follow:

Array Allocated?: Indicates if the device is allocated for use by the array. The following types of devices are considered array allocated:
- Symmetrix
  - LUN masked primary logical devices and non-established replica devices mapped to access-controlled front-end ports
  - Primary logical devices and non-established replica devices mapped to non access-controlled front-end ports
  - Local replicas (split or synchronized) associated with array allocated primary devices (includes multihop to n levels)
  - Remote replicas (split or synchronized) associated with array allocated local replicas or array allocated primary devices external to this array (includes multihop to n levels)
  - LUN masked VDEVs mapped to access-controlled front-end ports
  - VDEVs mapped to non access-controlled front-end ports
  - Devices included in API device groups
  - System resources
- CLARiiON
  - Access Logix enabled—LUNs bound to Storage Groups that also contain an HBA plus system resources
  - Access Logix disabled—all configured LUNs plus system resources
- HDS/HP XP
  - LUN masked devices mapped to security-enabled ports
  - Devices mapped to non security-enabled ports
  - System resources
- IBM ESS
  - LUN masked primary logical devices mapped to access-controlled front-end ports
  - Primary logical devices mapped to non access-controlled front-end ports
- HP StorageWorks EMA—LUN masked primary logical devices mapped to access-controlled front-end ports Array Allocation Type: Describes how the array device has been allocated within the array. If the array device is not allocated, this column is blank. If the host is known this also describes how the device is considered allocated to a host.
- Symmetrix
  - Valid values are Primary, Local Replica, Remote Replica, and System Resource:
    - Primary—Primary devices
    - Local Replica—BCV devices, VDEVs, and non-established replicas
    - Remote Replica—R2 devices
    - System Resource—VCMDB devices, Gatekeeper devices, SFS devices, RAD devices, COVD devices, saved pool devices, DRVs and their mirrors, and spare disks
- CLARiiON—Valid values are Primary and System Resource.
- HDS/HP XP—Valid values are Primary and System Resource.
- IBM ESS—Valid value is Primary.
- HP StorageWorks EMA—Valid value is Primary.

Array Device Capacity—Raw (GB): Total capacity of this logical device (non-meta, meta head, or meta member) including any defined protection capacity Array Device Capacity—Usable (GB): Capacity on this logical device (non-meta, meta head, or meta member) available for use by the array. Does not include any defined protection capacity.

Array Device Type: Array device type Not reported for arrays discovered by the Storage Agent for SMI.

Array Type: Type of array For arrays discovered by the Storage Agent for SMI, the array type is reported based on the information available from the SMI provider implemented on the array.

Consistency Group Name: Name of the consistency group to which the device belongs. Applies to Symmetrix devices only. A consistency group is a user-defined group of Symmetrix SRDF devices used to maintain the integrity of remote replication of the devices.

Emulation: Emulation mode of the device. Applies to Symmetrix and HDS/HP XP arrays only. Device emulation modes for Symmetrix devices include FBA and CKD. For HDS/HP XP arrays, the logical devices (LDEVs) associated with a RAID group may have an emulation mode (for example, OPEN-L).

Host Accessible?: Indicates if the array device is accessible to the host

Host Accessible Description: Describes why or why not the array device is accessible to the host
- LUN Masked, Not Connected Primary logical device or non-established replica that is LUN masked and mapped to an access-controlled front-end port that is not physically connected
- Mapped to port, Not Connected Specific to Symmetrix arrays. Primary logical device or non-established replica mapped to front-end port of iSCSI type
- Non Lun Masked, Not Connected Specific to Access Logix disabled CLARiiON. Primary logical device mapped to front-end port, but not physically connected to host
- Lun Masked, Visible to Host Primary logical device or non-established replica that is LUN masked and mapped to access-controlled front-end port and is physically connected through direct attach or switch that is not yet discovered by FCC agent Lun Masked, Zoned and Connected to Host Primary logical device or non-established replica that is LUN masked and mapped to access-controlled front-end port and is physically connected through discovered switch Visible to Host through non access controlled port Primary logical device or non-established replica that is physically connected through direct attach or switch that is not yet discovered by FCC agent Zoned and Connected to Host through non access controlled port Primary logical device or non-established replica mapped to non access controlled front-end port and is physically connected through a discovered switch Host Device Found Logical device for which host has created a host device. Only seen if host agent is running.

Host Allocated?: Indicates if the device is allocated to the host. The following are considered host allocated:

Symmetrix
- LUN masked primary logical devices and non-established replica devices mapped to access-controlled front-end ports
- Primary logical devices and non-established replica devices that mapped to non access-controlled front-end ports which are physically connected to hosts
- Local replicas (split or synchronized) associated with array allocated primary devices (includes multihop to n levels)
- Remote replicas (split or synchronized) associated with array allocated local replicas or array allocated primary devices (includes multihop to n levels)
- LUN masked VDEVs mapped to access-controlled front-end ports
- VDEVs mapped to non access-controlled front-end ports CLARiiON
- Access Logix enabled—LUNs bound to Storage Groups that also contain an HBA
- Access Logix disabled—all configured LUNs on a CLARiiON that is physically connected to a host HDS/HP XP
- LUN masked devices masked to security-enabled ports
- Devices mapped to non security-enabled ports IBM ESS
- LUN masked primary logical devices mapped to access-controlled front-end ports
- Primary logical devices mapped to non access-controlled front-end ports which are physically connected to hosts HP StorageWorks EMA—LUN masked primary logical devices mapped to access-controlled front-end ports Host Allocated Description: Describes why or why not the array device is allocated to the host Accessible Primary Device • LUN masked primary logical devices and non-established replicas mapped to access-controlled front-end ports which are physically connected to hosts
- Primary logical devices mapped to non access-controlled front-end ports which are physically connected to hosts Accessible replica with no Source device • Non-established replica devices that are LUN masked and mapped to access-controlled front-end ports that are physically connected to hosts
- Non-established replica devices mapped to non access-controlled front-end ports that are physically connected to hosts Accessible replica with unaccessed source device • Replica devices that are LUN masked and mapped to access-controlled front-end ports that are physically connected to hosts but the source of the replica is not accessible
- Replica devices that are mapped to non access-controlled front-end ports that are physically connected to hosts but the source of the replica is not accessible Accessible Virtual Device Applicable to Symmetrix arrays only for these conditions:
- VDEVs LUN masked and mapped to access-controlled front-end ports that are physically connected to hosts
- VDEVs mapped to non access-controlled front-end ports that are physically connected to hosts Device mapped to iSCSI port Primary logical devices and non-established replica devices mapped to front-end ports of iSCSI type LUN Masked but not accessible device Primary logical devices and non-established replicas that are LUN masked and mapped to access-controlled front-end ports, but are not physically connected Member of API Device Group API device group is array allocated, but device not host allocated Replica of an Allocated Primary BCV device of an array allocated primary device Replica of an Allocated Replica R2 device of an array allocated replica device Replica of a primary allocated to same host BCV device and primary device are allocated to the same host. This typically occurs when the primary device and the BCV are accessing the same host.

Replica of a replica allocated to same host BCV and R2 device are allocated to the same host. This typically occurs when the BCV device and the R2 device are accessing the same host.

LUN Masked?: Indicates if the array device is LUN masked. A device is considered LUN masked if:
- Symmetrix, HP StorageWorks EMA, IBM ESS—the device is LUN masked to an HBA
- CLARiiON—the device is part of a CLARiiON Storage Group that also contains at least one HBA
- HDS/HP XP
  - the device is LUN masked to an HBA or Host Group
  - the LUN Group that contains the device is LUN masked to an HBA or Host Group
  - the device and the HBA are in a common Storage Domain Mapped?: Indicates if the array device is mapped to a front-end port. A device is considered mapped if:
- Symmetrix, HDS/HP XP, HP StorageWorks EMA, IBM ESS—the device is mapped to a front-end port
- CLARiiON
  - Access Logix enabled—the device is part of a Storage Group
  - Access Logix disabled—all devices are considered mapped Meta Device Capacity—Raw (GB): Total capacity on this logical device (non-meta, meta head, or meta member) that can be made available to hosts including any defined protection capacity. For non-meta devices and meta heads, it is the same as Meta Device Capacity—Usable plus any defined protection capacity. Always 0 (zero) for a meta member.

Meta Device Capacity—Usable (GB): Capacity on this logical device (non-meta, meta head, or meta member) that can be made available to hosts. Does not include any defined protection capacity. For a non-meta device, it is the same as Array Device Capacity—Usable. For a meta head, it is the sum of the meta head and its associated meta members. Always 0 (zero) for a meta member.

Used By File System?: Indicates if the array device is used by a host file system Used by Volume Group?: Indicates if the array device is used by a volume group User-defined Device Capacity—Raw (GB): For CLARiiON metaLUNs only, user-defined portion of the Meta Device Capacity—Usable. For all other array device types, same as Meta Device Capacity—Usable.

User-defined Device Capacity—Usable (GB): For CLARiiON metaLUNs only, user-defined portion of Meta Device Capacity—Raw. For all other array device types, same as Meta Device Capacity—Raw.

As indicated above, the exemplary configuration also provides filtering of the output based on particular allocation parameters. In particular, a filter tab or other suitable GUI icon is operable to define and employ a filter as follows:

Use the Filter tab to filter the data that appears in your report. You can specify up to 10 filters. The following filter options are available.

Column Select the types of data (columns) by which you want the report filtered. The list boxes contains all possible columns in the type of report. However, selecting a column for filtering only means that the report will be filtered by the data in that column. For the column to actually appear in the report, you must select that column on the Table tab. For example, you might create a filter so that you only see data for hosts that have more than one CPU, but not want the number of CPUs column to appear in the report.

Operator Select an operator for the data type selected in Column. The type of operators that are valid depends on the type of data. Filtering data is case-sensitive. If you are filtering on a column that contains alphabetic characters and you want to include certain values regardless of their case, choose one of the ignore case operators.

Value Enter the value or values that you want the operator to act upon. If the chosen operator allows more than one value or there are any restrictions on the type of value you can enter (for example, numeric only), the value field will contain a message to that effect. In particular configurations, the data type for switch port numbers may be changed to allow alphanumeric (instead of numeric only) values.

The SAN simulation framework and mechanism disclosed herein may encompass a variety of alternate deployment environments. In a particular configuration, as indicated above, the exemplary SAN management application discussed may be the EMC Control Center (ECC) application, marketed commercially by EMC corporation of Hopkinton, Mass., assignee of the present application.

Those skilled in the art should readily appreciate that the programs and methods for reporting device allocation in a storage area network as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for reporting device allocation in a storage area network has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of reporting device allocation in a storage area network comprising:
generating allocation data indicative of a set of allocation parameters of manageable entities in the storage area network, the set of allocation parameters including predetermined allocation parameters and derived fields;
receiving a layout, the layout indicative of a user specified subset of the set of allocation parameters for display in an output report, each of the allocation parameters in the subset corresponding to output fields operable for display;
identifying, from the output fields, the derived fields specified in the layout, the derived fields determinable from other allocation parameters in the set of allocation parameters;
determining usage metrics operable to compute the derived fields from the predetermined allocation parameters in the set of allocation parameters; and
computing the identified derived fields from the determined usage metrics using the subset of allocation parameters for display as an allocation report on a display console.

2. The method of claim 1 wherein the allocation parameters include foundation variables, device attributes, and derived fields, wherein the foundation variables are predetermined, the device attributes correspond to a configuration of a particular storage array device, and the derived fields are operable for computation from other allocation parameters.

3. The method of claim 2 further comprising computing the derived fields from usage metrics, the usage metrics indicative of allocation parameters and operations for computing the derived fields.

4. The method of claim 3 further comprising:
identifying predetermined allocation parameters;
retrieving device attributes from at least one storage array device; and
computing the derived fields from operations specified by the usage metrics.

5. The method of claim 1 wherein computing the derived fields comprises:
identifying corresponding allocation parameters from devices of each of a plurality of vendors; and
coalescing the corresponding parameters for generating the output fields.

6. The method of claim 5 wherein coalescing comprises identifying different vendor specific allocation parameters employed for computing a derived field.

7. The method of claim 6 wherein the layout is indicative of a filter selection, the filter selection specifying allocation parameters for inclusion as output fields.

8. The method of claim 7 wherein the filtering criteria includes at least one of LUN masking, HBA ports, masking, vendors.

9. The method of claim 8 wherein the output fields are indicative of a progression of available storage, reserved storage, configured storage, allocated storage, and used storage.

10. A method of reporting allocation parameters for storage devices in a storage area network comprising:
gathering allocation data indicative of report variables for the storage devices;
receiving a user selection of a layout indicative of a set of storage devices and output fields for inclusion an output report, the output fields including foundation variables, device attributes, and derived parameters;
identifying, from the layout, foundation variables corresponding to the storage devices selected for inclusion in the output report;
retrieving, from the allocation data, the identified foundation variables;
identifying, from the layout, device attributes corresponding to the selected output fields for the selected storage devices, the device attributes specific to a particular storage device;
gathering the identified device attributes;
identifying derived parameters corresponding to the selected layout;
determining usage metrics operable to compute the identified derived parameters, the usage metrics including operations on the foundation variables and device attributes operable to compute derived parameters;
computing the identified derived parameters by applying the operations from the determined usage metrics;
formatting the foundation variables, device attributes, and derived parameters corresponding to the selected layout for display as an allocation report on a display console.

11. A storage area network management server device for reporting storage allocation in a storage area network comprising:
a management application adapted to execute on the management device and in communication with manageable entities in the storage area network;
an interface to a repository having generated allocation data indicative of a set of allocation parameters of the manageable entities in the storage area network, the set of allocation parameters including predetermined allocation parameters and derived fields;
a user interface coupled to the management application operable to indicate a selection of one of a plurality of layouts, the layout indicative of a user specified subset of the set of allocation parameters for display in an output report, each of the parameters in the subset corresponding to output fields operable for display;
a metadata parser in the management application operable to identify, from the output fields, the derived fields specified in the layout, the derived fields determinable from other allocation parameters in the set of allocation parameters; and
a set of usage metrics operable to compute the derived fields from the predetermined allocation parameters in the set of allocation parameters, the management application operable to compute the identified derived fields from the determined usage metrics using the allocation parameters.

12. The server device of claim 11 wherein the allocation parameters include foundation variables, device attributes, and derived fields, wherein the foundation variables are predetermined, the device attributes correspond to a configuration of a particular storage array device, and the derived fields are operable for computation from other allocation parameters.

13. The server device of claim 12 wherein the management application is further operable to compute the derived fields from the usage metrics, the usage metrics indicative of allocation parameters and operations for computing the derived fields.

14. The server device of claim 13 wherein the usage metrics are further operable to
identify predetermined allocation parameters, and the management application is operable to:
retrieve device attributes from at least one storage array device; and
compute the derived fields from operations specified by the usage metrics.

15. The server device of claim 11 wherein the management application is further operable to:
identify corresponding allocation parameters from devices of each of a plurality of vendors; and
coalesce the corresponding parameters for generating the output fields.

16. The server device of claim 15 wherein the management application is operable to identify different vendor specific allocation parameters employed for computing a derived field.

17. The server device of claim 16 wherein the layout is indicative of a filter selection, the filter selection specifying allocation parameters for inclusion as output fields.

18. The server device of claim 17 wherein the filtering criteria includes at least one of LUN masking, HBA ports, masking, vendors.

19. The server device of claim 18 wherein the output fields are indicative of a progression of available storage, reserved storage, configured storage, allocated storage, and used storage.

20. A computer program product having an encoded set of processor based instructions defined as computer program code on a computer readable storage medium operable to store computer program logic embodied in computer program code encoded thereon that, when executed by a processor in the computer, performs steps for reporting device allocation in a storage area network comprising:
computer program code for generating allocation data indicative of a set of allocation parameters of manageable entities in the storage area network, the set of allocation parameters including predetermined allocation parameters and derived fields;
computer program code for receiving a layout, the layout indicative of a user specified subset of the set of allocation parameters for display in an output report, each of the allocation parameters in the subset corresponding to output fields operable for display;
computer program code for identifying, from the output fields, the derived fields specified in the layout, the derived fields determinable from other allocation parameters in the set of allocation parameters;
computer program code for determining usage metrics operable to compute the derived fields from predetermined allocation parameters in the set of allocation parameters; and
computer program code for computing the identified derived fields from the determined usage metrics using the subset of allocation parameters.

21. An encoded set of processor based instructions defined as program code on a computer readable storage medium that, when executed by a processor in the computer, performs steps for reporting device allocation in a storage area network comprising:

program code for generating allocation data indicative of a set of allocation parameters of manageable entities in the storage area network, the set of allocation parameters including predetermined allocation parameters and derived fields;

program code for receiving a layout, the layout indicative of a user specified subset of the set of allocation parameters for display in an output report, each of the allocation parameters in the subset corresponding to output fields operable for display;

program code for identifying, from the output fields, the derived fields specified in the layout, the derived fields determinable from other allocation parameters in the set of allocation parameters;

program code for determining usage metrics operable to compute the derived fields from the predetermined allocation parameters in the set of allocation parameters; and program code for computing the identified derived fields from the determined usage metrics using the subset of allocation parameters.

22. A storage area network management server device including an encoded set of processor based instructions defined as program code on a computer readable storage medium that, when executed by a processor in the computer, performs steps for reporting storage allocation in a storage area network comprising:

means for generating allocation data indicative of a set of allocation parameters of manageable entities in the storage area network, the set of allocation parameters including predetermined allocation parameters and derived fields;

means for receiving a layout, the layout indicative of a user specified subset of the set of allocation parameters for display in an output report, each of the allocation parameters in the subset corresponding to output fields operable for display;

means for identifying, from the output fields, the derived fields specified in the layout, the derived fields determinable from other allocation parameters in the set of allocation parameters;

means for determining usage metrics operable to compute the derived fields from the predetermined allocation parameters in the set of allocation parameters; and means for computing the identified derived fields from the determined usage metrics using the subset of allocation parameters.

\* \* \* \* \*